United States Patent
Potter et al.

[15] 3,671,692
[45] June 20, 1972

[54] RISING STEM VALVE REMOTE POSITION INDICATOR

[72] Inventors: Jack D. Potter; Bernard W. Reams, both of Tulsa, Okla.

[73] Assignee: Warren Petroleum Corporation, Tulsa, Okla.

[22] Filed: June 7, 1971

[21] Appl. No.: 150,363

[52] U.S. Cl.............................................200/61.86, 340/238
[51] Int. Cl. .........................................................H01h 9/06
[58] Field of Search ..................200/61.86, 47, 158; 340/238

[56] References Cited

UNITED STATES PATENTS 792,258  6/1905  Grinnell..............................200/61.86

Primary Examiner—Robert K. Schaefer
Assistant Examiner—M. Ginsburg
Attorney—Meyer Neishloss, Deane E. Keith and Paul L. Tillson

[57] ABSTRACT

A rising stem valve position indicator having a sleeve mounted on the handwheel of the valve extending upwardly a distance adequate to enclose the valve stem when the valve is in the full open position. A rod extends from the end of the valve stem through the sleeve to support a sleeve cover that moves down over the sleeve to cover it when the valve is closed. Downward movement of the cover on closing the valve depresses an upwardly biased ring to close a switch and actuate a signal indicating the valve is closed.

7 Claims, 2 Drawing Figures

INVENTORS.
JACK D. POTTER
BERNARD W. REAMS

RISING STEM VALVE REMOTE POSITION INDICATOR

This invention relates to valves and more particularly to apparatus for indicating whether rising stem valves are in an open or closed position.

At many pipeline terminals and processing plants, batteries of valves are connected into manifolds. Frequently, sufficient time is not available to check each valve manually in, for example, changing delivery of fluids from one vessel to another. It is desirable to be able to ascertain visually and quickly whether a valve is in an open or closed position to avoid mistakes by pumpers in setting lines for delivery of fluids.

The increased automation of pipeline and processing plant operations has led to control of operations from a central control house. It is desirable not only to be able to operate a valve from a remotely located control house but also to provide an instant indication of whether or not the valve is open.

This invention relates to an indicator for rising stem valves in which a sleeve mounted on the handwheel of the valve encircles the valve stem. A sleeve cover in the form of an inverted thimble supported by a rod extending from the end of the valve stem is adapted to move from a position exposing the sleeve when the valve is open, to a position covering the sleeve and actuating a switch to send a signal of the valve position to a remote location.

Figure 1:
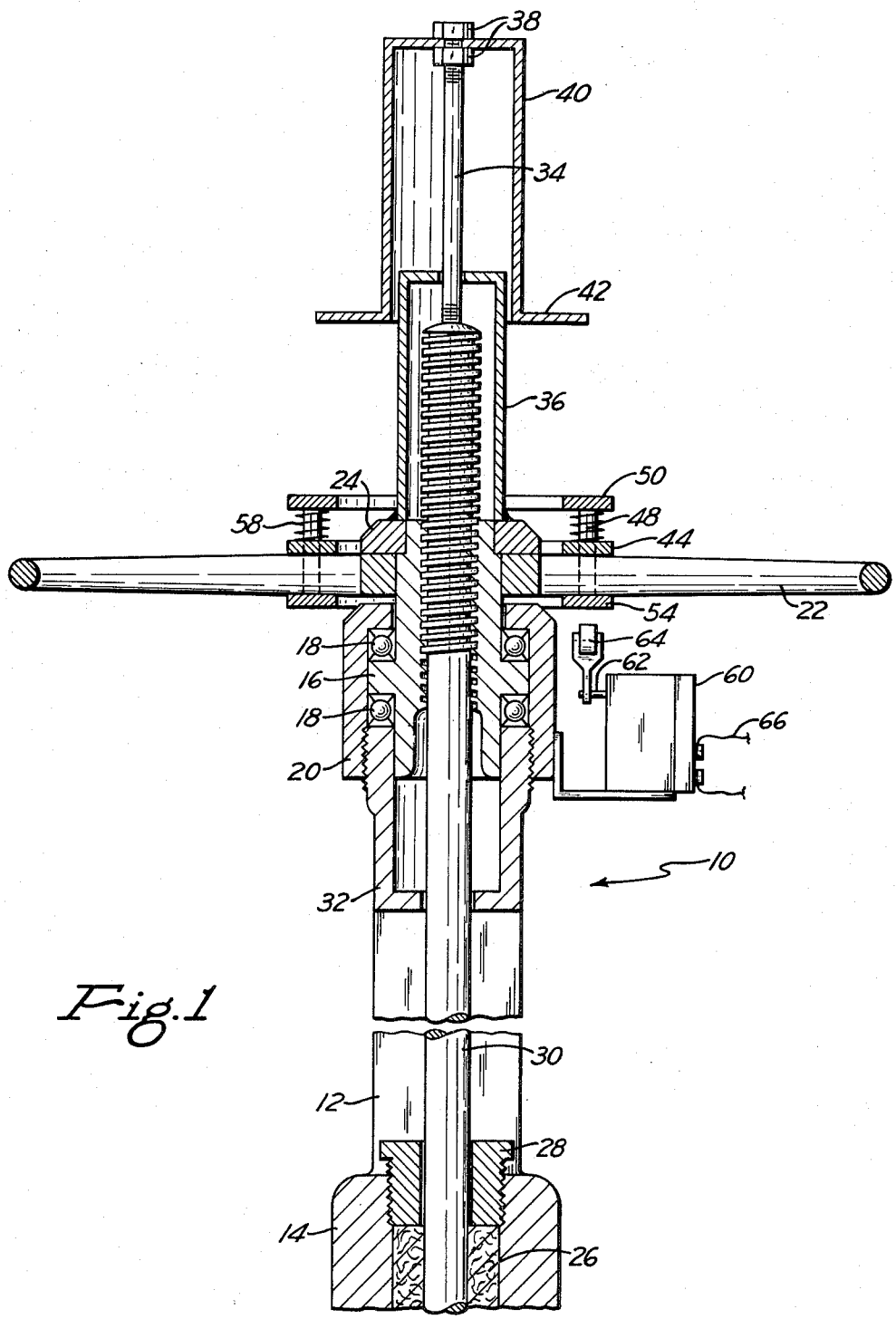
FIG. 1 is a fragmentary vertical sectional view of a rising stem valve having the indicator of this invention mounted thereon.
Figure 2:
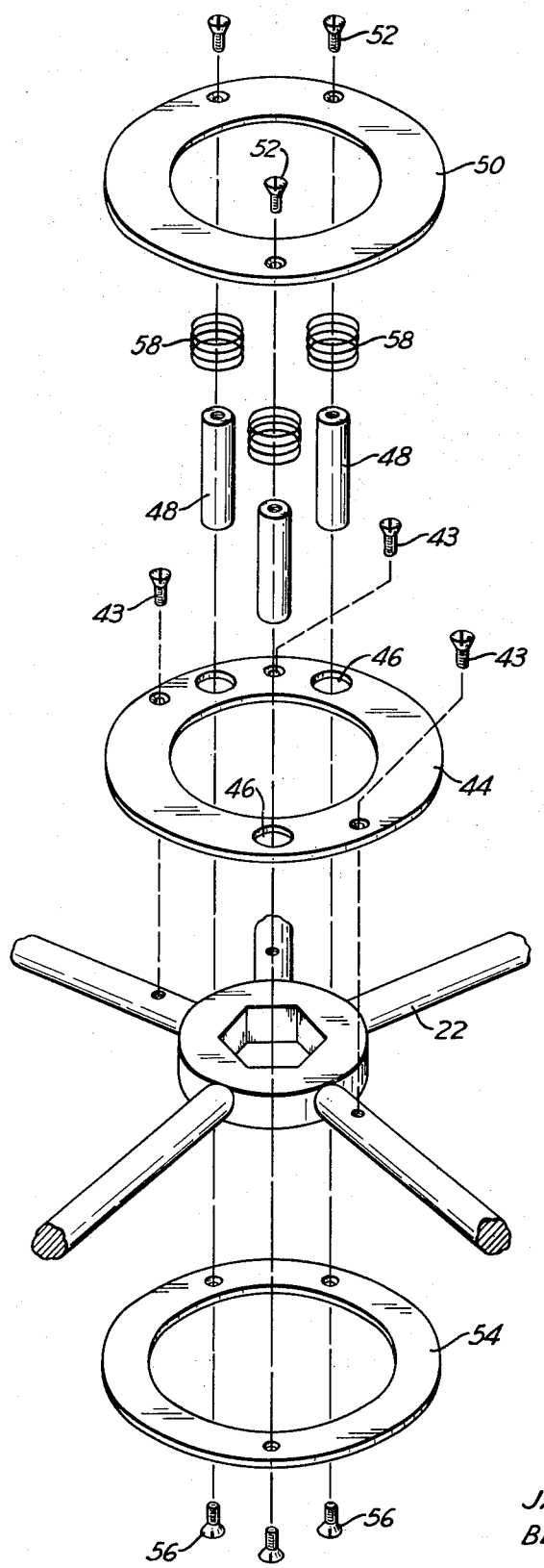
FIG. 2 is an expanded view showing the assembly of the elements of the indicator with reference to the handwheel of a rising stem valve.

Referring to FIG. 1 of the drawings, a rising stem valve, indicated generally by reference numeral 10, has a yoke 12 extending upwardly from the valve bonnet 14. An internally threaded bushing 16 is rotatably mounted on the upper end of the yoke 12. Suitable bearings 18 are provided to allow the bushing to rotate freely. Bushing 16 is held in place on the yoke by a cap 20, internally threaded at its lower end for attachment to the upper end of the yoke 12.

Bushing 16 extends upwardly through an opening in the upper end of cap 20 and through a handwheel 22 of the rising stem valve 10. The portion of the bushing above the level of cap 20 is of a nonround, such as hexagonal, shape to snugly fit a central opening of the same shape in the handwheel whereby any movement of the handwheel is transmitted directly to the bushing. Bushing 16 may be of circular cross section and threaded above the handwheel to receive a nut 24 which holds the handwheel firmly on the bushing.

Extending upwardly through the bonnet 14, packing 26, and packing gland 28 of valve 10 is a valve stem 30. Valve stem 30 is externally threaded at its upper end to engage the internal threads of bushing 16 whereby rotation of the bushing causes vertical movement of the valve stem. When the valve is open, the valve stem 30 extends upwardly above the upper surface of the handwheel 22 and nut 24 as illustrated in FIG. 1. In the form of the invention illustrated in FIG. 1, the yoke 12 includes a shroud 32 which extends downwardly below the level of the lower end of bushing 16, a distance adequate to cover the threads on the valve stem when the valve stem is in the closed position.

The upper end of valve stem 30 is drilled and tapped to receive a rod 34 threaded at both ends. A sleeve 36 mounted on the upper surface of nut 24 extends upwardly around the valve stem 30, a distance adequate to permit the valve stem to move upwardly within the sleeve for full opening of the valve. The upper end of sleeve 36 has an opening through which rod 34 extends.

Adjustably supported on the upper end of rod 34 between locking nuts 38 is a sleeve cover 40. Sleeve cover 40 is in the shape of an inverted thimble having an outwardly extending flange 42 at its lower end and a diameter large enough to allow the cover to move downwardly over the sleeve 36 when the valve is closed. Rod 34 is long enough to extend above the upper end of sleeve 36 and cover 40 is long enough to cover sleeve 36 when the valve is closed.

An upwardly biased triggering mechanism to be activated by downward movement of cover 40 to the closed valve position to operate a switch is mounted on handwheel 22. For this purpose, handwheel 22 is drilled and tapped in at least three spokes or, if the hub of the handwheel is large enough, in the hub, to receive screws 43 that secure a guide ring 44 on the handwheel. Holes 46 in the guide ring slidably receive pins 48 that are drilled and tapped at their upper and lower ends. An upper ring 50 is held in place on the upper end of the pins 48 by screws 52 extending through countersunk holes in ring 50. Pins 48 extend downwardly through the guide ring to a level below the handwheel 22 and a lower ring 54 is held on the lower end of the pins 48 below the handwheel 22 by screws 56. The lower ring 54 and upper ring 50 are biased to an upper position, illustrated in FIG. 1, by compressed helical springs 58 around the pins above the guide ring 44. A microswitch 60 mounted on the cap 20 below handwheel 22 has an arm 62 extending outwardly to support a roller 64 below the lower ring 54. Electrical lead lines 66 extend from the microswitch 60 to a suitable alarm or indicating device, not shown.

In the operation of the indicating device of this invention, the handwheel 22 is turned to rotate the bushing 16 and thereby raise the valve stem 30. Rod 34 lifts the sleeve cover 40 to the position illustrated in FIG. 1 which exposes the sleeve 36. Sleeve 36 is of large enough diameter, for example twice the diameter of the valve stem, and preferably is of a bright color to allow an observer to visually determine from a substantial distance whether or not the valve is open.

If the handwheel 22 is turned to lower the valve stem and close the valve, the sleeve cover 40 is lowered over the sleeve. Continued turning of the handwheel results in flange 42 bearing against the upwardly biased upper ring 50 and pushing the pins 48 and lower ring 54 downwardly to engage the roller 64 and close microswitch 60. A signal is sent through lines 66, by the closing of microswitch 60, to a suitable warning device, such as a light, or horn, or an indicator at a control house. While the switch has been described as being closed on closing the valve, the mechanism obviously could be used to break the circuit to the indicating device when the valve is closed. A reference has been made to turning the handwheel 22. It will be appreciated, that the bushing 16 can be turned by a motor-driven wheel remotely controlled to operate the valve. The pin and ring assembly will then be supported on the motor-driven wheel.

In this specification and the claims, reference is made to parts located "above" the handwheel of the valve. The term "above" is used because the valve is ordinarily installed in a vertical position with the handwheel above the body of the valve whereby the valve stem rises as the valve is opened. This invention is not limited to that orientation of the valve. If the valve should be installed horizontally or in any orientation other than the vertical position described above, the description of an element of structure as being "above" another means that it is farther from the valve body than the other.

It is an important advantage of this invention that there is no equipment above the handwheel that would interfere with the operation of the handwheel. The sleeve 36 and sleeve cover 40 are positioned over the hub of the handwheel and do not interfere with its operation. Moreover, all of the electrical equipment is positioned below the level of the handwheel where it is protected from damage and does not interfere with operation of the valve. The indicating device of this invention has a further advantage of covering the threads on the stem from the atmosphere, which in many processing plants can be highly corrosive. The upper and lower rings of the triggering mechanism provide a smooth, continuous surface for contact with the flange on the sleeve cover and the roller that provides flexibility in operation and eliminates the need for frequent readjustment as the valve becomes worn.

We claim:

1. Apparatus for indicating the position of a rising stem valve having a yoke extending upwardly from the valve body and a handwheel rotatably mounted at the upper end of the yoke for operation of the valve wherein the improvement comprises a sleeve supported by the handwheel in position to enclose the stem of the rising stem valve when the valve is open, a cylindrical cover supported from the valve stem for movement by the valve stem from a position encircling the sleeve when the valve is closed to a position exposing the sleeve when the valve is open, and triggering mechanism for actuating a switch mounted on the handwheel of the valve and including an upwardly biased element positioned to engage the cover when the valve is closed.

2. Apparatus as set forth in claim 1 wherein said switch is mounted on the valve below the handwheel in position for engagement with and operation by the triggering mechanism.

3. Apparatus as set forth in claim 1 including a shroud extending downwardly from the yoke to encircle the threads on the valve stem when the valve is closed.

4. In apparatus for indicating the position of the valve element in a rising stem valve having a yoke extending upwardly from the valve body, an internally threaded bushing rotatably supported on the end of the yoke remote from the valve body, a cap holding the bushing in place on the yoke, a handwheel engaging the bushing above the cap for rotation integrally with the bushing, and an externally threaded valve stem extending upwardly through the bushing and including means whereby rotation of the handwheel causes axial movement of the valve stem through the bushing, the improvement comprising a sleeve supported by the handwheel encircling the valve stem and extending upwardly from the handwheel a distance at least equal to the distance moved by the valve stem between the open and closed positions of the valve, a rod secured to the end of the valve stem and extending upwardly beyond the sleeve, a cylindrical cover secured to the rod and extending downwardly therefrom around the sleeve, said cover having an outwardly extending flange at its lower end, a triggering mechanism mounted on the handwheel and including an upwardly biased element positioned for engagement with and actuation by the flange on the cover as the valve is closed, and a switch supported by the valve yoke below the handwheel in position for actuation by the triggering mechanism.

5. Apparatus as set forth in claim 4 in which the triggering mechanism includes a guide ring secured to the handwheel, said guide ring having a plurality of holes extending therethrough, pins slidable in the holes, an upper ring of a diameter to engage the flange on the cover secured to the upper end of the pins, a lower ring secured below the handwheel to the lower end of the pins, and compressed helical springs surrounding the pins between the guide ring and the upper ring urging the upper and lower rings upwardly.

6. Apparatus as set forth in claim 5 in which the switch is supported by the yoke below the handwheel and includes a switch arm, a roller mounted on the switch arm in alignment with the lower ring whereby the roller engages the lower ring when that ring is depressed and actuates the switch.

7. Apparatus providing an indicator of the position of a rising stem valve having a sleeve mounted on the handwheel and extending upwardly therefrom to encircle the valve stem above the handwheel when the valve is open, and a cover supported by the valve stem extending downwardly over the sleeve to encircle the sleeve when the valve is closed, and a triggering mechanism comprising an upper ring surrounding the valve stem below the cover, pins slidably supported by the handwheel extending upwardly through the handwheel and connected at their upper ends to the upper ring, a lower ring secured to the lower end of the pins below the handwheel, compressed springs between the upper ring and the handwheel urging the upper and lower rings upwardly and a switch supported by the valve and having an arm in alignment with the lower ring whereby depression of the triggering mechanism actuates the switch.

* * * * *